Patented Aug. 17, 1926.

1,596,662

UNITED STATES PATENT OFFICE.

JOHN D. JENKINS AND EUGENE F. BERGER, OF MILWAUKEE, WISCONSIN, ASSIGNORS TO PITTSBURGH PLATE GLASS COMPANY, A CORPORATION OF PENNSYLVANIA.

PROCESS OF MANUFACTURING ARSENATES.

No Drawing.    Application filed August 21, 1924.   Serial No. 733,440.

The invention relates to a process of making arsenates and particularly sodium, potassium and calcium arsenates. The invention has for its principal objects, the provision of an improved process by means of which the arsenates may be produced at a lower cost than has heretofore been possible by the process commonly employed, involving the use of nitric acid with a recovery plant for the acid, and calling for relatively high investment and maintenance charges.

One specific method for practicing the invention is as follows, it being understood, however, that the invention is not limited to this specific method, and that it is capable of considerable variation as hereinafter pointed out.

Crude or refined white arsenic, $As_2O_3$, is first dissolved in an 8 percent. solution of sodium hydroxide in the ratio of ten parts of solution to one part of white arsenic, the ratio of hydroxide to white arsenic in the solution thus being 0.8 to 1, or in round numbers 8 to 10. This gives a water solution of sodium arsenite, and causes the precipitation of any iron in the white arsenic, which can then be readily filtered off.

The solution thus formed is heated up to about 90° C., and finely divided metallic copper, or a compound containing copper, such as copper sulphate, $(CuSO_4-5H_2O)$, is added to the solution, preferably in the proportion by weight of 0.005 parts to 0.2 parts of copper to 1 of the white arsenic. The mixture is then blown with air, keeping the temperature of the solution between 40° and 100° C. About six hours of air blowing serves to convert the sodium arsenite by air oxidation largely or wholly into sodium arsenate. During this conversion, the copper acts as a catalyst and is precipitated from the solution. The solution is then filtered to remove the copper, and the sodium arsenate thus produced may be considered as a finished article of manufacture. Sodium arsenate may be sold directly in solution or as a salt crystallized therefrom. If the process is to stop with the manufacturing of sodium arsenate much stronger solutions of arsenite may be used, thus reducing the cost of crystallization and recovery of the arsenate formed.

If calcium arsenate is desired, the solution of sodium arsenate obtained above is brought together in a suitable tank with calcium hydroxide, the latter in some excess, causing the formation of calcium arsenate and a solution of sodium hydroxide. The precipitated calcium arsenate is filtered off and washed with water, and the filtrate and washings containing the sodium hydroxide are used to dissolve a fresh batch of white arsenic. The copper and sodium hydroxide may thus be recovered and used repeatedly in the cycle with the addition of enough fresh materials to make up for the relatively small losses of these materials.

The foregoing specifically stated example of the practice of the process may be considerably varied. The degree of concentration of the sodium arsenite solution may be modified over a wide range and the ratio of sodium hydroxide to white arsenic in the solution may be made to vary from 12 to 10 to 8 to 10 by weight. If a smaller proportion of hydroxide than this is used, the oxidation is not complete, and if a larger percentage is used, there is necessarily a greater loss of the hydroxide, and greater difficulty in manufacturing calcium arsenate from the product. The invention in its broadest form therefore contemplates a wider range than the one specified, but the range specified indicates the best practice from an economic standpoint. If desired, the copper may be first mixed with the sodium hydroxide and the white arsenic added, instead of first mixing the arsenic with the hydroxide before adding the copper as heretofore set forth. While blowing with air is the preferred method of oxidizing, this may be done in other ways, as by the use of oxygen or ozone or by the use of mixtures, including these elements. While sodium hydroxide is preferably used for dissolving the white arsenic, it is possible to substitute sodium carbonate for the hydroxide, or a mixture of sodium hydroxide and sodium carbonate may be used, or a suspension or solution of calcium hydroxide $Ca(OH)_2$ may be substituted in part for the sodium hydroxide or sodium carbonate. Also, in place of sodium hydroxide or carbonate, potassium hydroxide or carbonate may be used.

What we claim is:

1. A process of making arsenates of the alkali metals which consists in dissolving white arsenic in a weak alkali solution and oxidizing the alkali metal arsenite thus formed to alkali metal arsenate in the presence of copper in the solution as a catalyst.

2. A process of making arsenates of the alkali metals, which consists in dissolving white arsenic in a weak alkali solution and oxidizing the alkali metal arsenite thus formed by air blowing in the presence of copper in the solution as a catalyst.

3. A process of making sodium arsenate, which consists in dissolving white arsenic in a weak alkaline solution of a sodium compound, and oxidizing the sodium arsenite thus formed in the presence of copper in the solution as a catalyst.

4. A process of making sodium arsenate, which consists in dissolving white arsenic in a weak alkaline solution of a sodium compound and oxidizing the sodium arsenite thus formed by air blowing in the presence of copper in the solution as a catalyst.

5. A process of making sodium arsenate, which consists in dissolving white arsenic in a sodium hydroxide solution and oxidizing the sodium arsenate thus formed in the presence of copper in the solution as a catalyst.

6. A process of making sodium arsenate, which consists in dissolving white arsenic in a sodium hydroxide solution, and oxidizing the sodium arsenite thus formed by air blowing in the presence of copper in the solution as a catalyst.

7. A process of making sodium arsenate, which consists in dissolving white arsenic in a sodium hydroxide solution, and oxidizing the sodium arsenite thus formed in the presence of copper in the solution as a catalyst, the ratio of sodium hydroxide in the solution to the white arsenic by weight being approximately eight to ten.

8. A process of making sodium arsenate, which consists in dissolving white arsenic in a sodium hydroxide solution, and oxidizing the sodium arsenite thus formed in the presence of copper in the solution as a catalyst, the ratio of sodium hydroxide in solution to the white arsenic by weight ranging from twelve to ten to four to ten.

9. A process of making sodium arsenate, which consists in dissolving white arsenic in a sodium hydroxide solution, and oxidizing the sodium arsenite thus formed by air blowing in the presence of copper in the solution as a catalyst, the ratio of sodium hydroxide in solution to the white arsenic by weight ranging from twelve to ten to eight to ten.

In testimony whereof, we have subscribed our names this 17th day of July, 1924.

JOHN D. JENKINS.
EUGENE F. BERGER.